United States Patent
Chan et al.

(10) Patent No.: US 7,256,553 B1
(45) Date of Patent: Aug. 14, 2007

(54) LAMP DRIVING SYSTEM CONTROLLED BY ELECTRICAL ISOLATION

(75) Inventors: Chun-Kong Chan, Hsi Chih (TW); Jeng-Shong Wang, Taipei County (TW)

(73) Assignee: Lien Chang Electronic Enterprise Co., Ltd., Taipei County (TW)

( * ) Notice: Subject to any disclaimer, the term of this patent is extended or adjusted under 35 U.S.C. 154(b) by 0 days.

(21) Appl. No.: 11/517,381

(22) Filed: Sep. 8, 2006

(51) Int. Cl.
*H05B 37/02* (2006.01)

(52) U.S. Cl. ............... 315/246; 315/247; 315/307
(58) Field of Classification Search ......... 315/246, 315/247, 276, 307, DIG. 5
See application file for complete search history.

(56) References Cited

U.S. PATENT DOCUMENTS 6,072,283 A * 6/2000 Hedrei et al. ............ 315/307
6,181,086 B1 * 1/2001 Katyl et al. ............. 315/307

* cited by examiner

*Primary Examiner*—David Vu
(74) *Attorney, Agent, or Firm*—Rosenberg, Klein & Lee

(57) ABSTRACT

A lamp driving system controlled by electrical isolating is provided. The front-end power stage and the back-end power stage of the lamp driving system are electrically isolated each other by an electrical isolator. The lamp driving system includes a PFC controller for outputting a high voltage into a switching circuit. The switching circuit outputs a lamp driving voltage into the primary side of a boost transformer. A loading resonant network couples to the secondary side of the boost transformer, and generates a feedback signal. There are having the primary side of the electrical isolator, the PFC controller, the switching circuit and boost transformer coupled to a primary ground end. The PFC controller, the loading resonant network and the secondary side of the electrical isolator are coupled to a secondary ground end.

9 Claims, 5 Drawing Sheets

LAMP DRIVING SYSTEM CONTROLLED BY ELECTRICAL ISOLATION

BACKGROUND OF THE INVENTION

1. Field of the Invention

The present invention relates to a lamp driving system controlled by electrical isolation, and more particularly to a lamp driving system that uses an electrical isolator to control the signal isolation.

2. Description of Related Art

According to the IEC1000-3-2 international specification, a power supply having an input power over 75W needs to have a power factor correction (PFC) function, and thus a front-end power stage of a power supply generally includes a power factor correction controller. The power factor correction controller is a prior art that performs a power factor correction to an AC power while reducing the harmonic current in the power supply and producing an output of a constant voltage approximately equal to 400V.

Referring to FIG. 1 for a schematic circuit block diagram of a lamp driving system in accordance with a prior art, the lamp driving system 1 includes a power factor correction controller 10, an isolating DC/DC converter 12, a switching circuit 14, a PWM controller 16, a boost transformer 18, a loading resonant network 19, a voltage regulator 13 and a system controller 15.

A front-end power stage of the prior art lamp driving system 1 includes a power factor correction controller 10 and an isolating DC/DC converter 12. The power factor correction controller 10 receives an alternate current power AC and produces an output of a constant high voltage HV. The isolating DC/DC converter 12 converts a constant high voltage isolation into the output of a repeated voltage VCC for the back-end power stage of a prior art lamp driving system 1. The back-end power stage includes a switching circuit 14, a PWM controller 16, a boost transformer 18 and a loading resonant network 19. The prior art lamp driving system 1 uses a voltage regulator 13 to convert AC power into outputs of voltage in various different specifications, and the output voltage is provided for a system controller 15, a PWM controller 16, or other circuits.

When the prior art lamp driving system 1 is lit, the system controller 15 will output a start control signal ST to notice the PWM controller 16 to start lighting up the lamp, and the PWM controller 16 will produce a control signal SPWM to control the switch of the switching circuit 14. The switching circuit 14 switches the repeated voltage VCC to output a high-frequency switching power to the boost transformer 18, and the boost transformer 18 will boost the high-frequency switching power to a high-voltage switching power output for the loading resonant network 19. The PWM controller 16 will obtain a feedback signal SFB from the loading resonant network 19, and adjust the output of the control signal SPWM according to the feedback signal SFB to maintain the stability of the lamp driving system 1.

In a traditional lamp driving system 1, the front-end power stage requires a power factor correction controller 10 to improve the power factor, lower the harmonic current and produce a constant voltage, but the constant high voltage produced by the power factor correction controller 10 will affect the operations of the back-end PWM controller 16, the system controller 15 or other controllers. Therefore, the traditional lamp driving system 1 needs to use an isolating DC/DC converter 12 in the front-end power stage for the electrical isolation and voltage step-down, so as to assure the normal operation of the circuit in the back-end power stage.

In general, the isolating DC/DC converter 12 includes components such as a transformer, a controller, a switching circuit and a feedback network, and thus the isolating DC/DC converter 12 of a traditional lamp driving system 1 has a much higher price than other components, and the isolating DC/DC converter 12 occupies quite a large volume in the overall component layout of the lamp driving system 1.

With the consideration of the overall price and component layout of the lamp driving system, it is an important subject for manufacturers to waive the use of an isolating DC/DC converter 12 in a lamp driving system that requires a power factor correction controller to improve the power factor by providing a back-end power stage electrically isolated lamp driving system.

SUMMARY OF THE INVENTION

In view of the foregoing shortcomings of the prior art, the present invention provides a lamp driving system controlled by electrical isolation that uses an electrical isolator as an isolation of control signals, such that a high voltage produced by a front-end power stage of the lamp driving system will not affect the operations of various controllers of the back-end power stage.

The lamp driving system of the invention comprises: a power factor correction controller, a switching circuit, a boost transformer, a loading resonant network, an electrical isolator and a PWM controller. The power factor correction controller receives an AC power and outputs a high voltage; the switching circuit is coupled to the power factor correction controller and provided for receiving a high voltage and outputting a lamp driving voltage; a boost transformer has a primary side and a secondary side, wherein the primary side is coupled to the switching circuit and provided for receiving the lamp driving voltage; a loading resonant network is coupled to a secondary side of the boost transformer and produces a feedback signal; an electrical isolator has a primary side and a secondary side, wherein the primary side is coupled to the switching circuit, and the primary side of the electrical isolator, the power factor correction controller, the switching circuit and the primary side of the boost transformer are jointly coupled to the a primary ground end; and the PWM controller is coupled to the electrical isolator and the loading resonant network and provided for receiving the feedback signal and outputting a control signal to the switching circuit through the electrical isolator, and the PWM controller, the loading resonant network, the secondary side of the electrical isolator and the secondary side of the boost transformer are jointly coupled to the secondary ground end.

The lamp driving system of the invention further comprises a voltage regulator and a system controller, and the voltage regulator is coupled to the secondary ground end and provided for receiving the AC power and outputting a working voltage. The system controller is coupled to the voltage regulator, the PWM controller and the secondary ground end, and provided or receiving the working voltage and outputting a start control signal to the PWM controller.

To make it easier for our examiner to understand the innovative features and technical content, we use preferred embodiments together with the attached drawings for the detailed description of the invention, but it should be pointed out that the attached drawings are provided for reference and description but not for limiting the present invention.

DETAILED DESCRIPTION OF THE PREFERRED EMBODIMENTS

Figure 1:
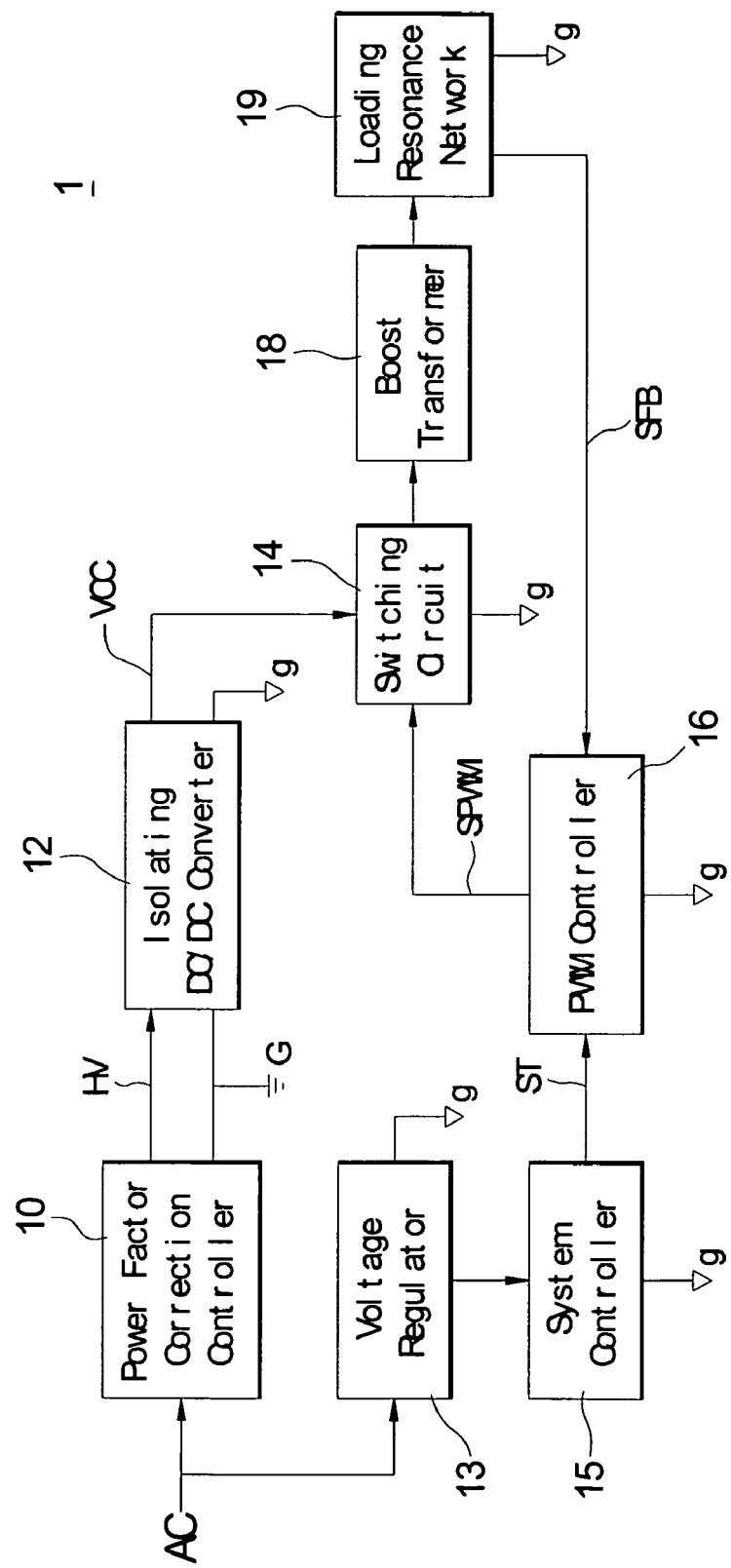
FIG. 1 is a schematic circuit block diagram of a lamp driving system in accordance with a prior art.
Figure 2:
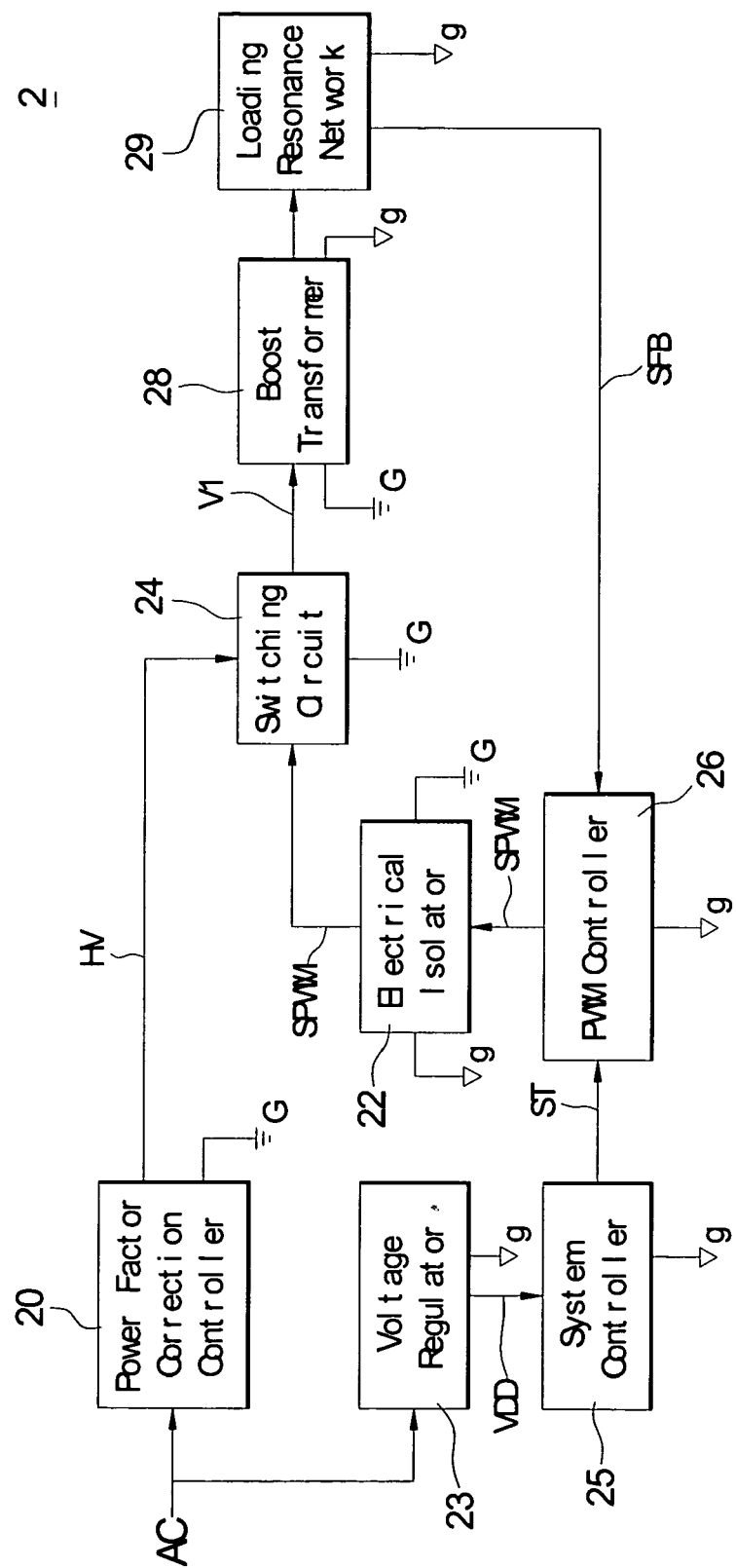
FIG. 2 is a schematic circuit block diagram of a lamp driving system in accordance with the present invention.

Referring to FIG. 2 for a schematic circuit block diagram of a lamp driving system in accordance with the present invention, the lamp driving system 2 is used for driving a backlight source of a display apparatus. The lamp driving system 2 drives a cold cathode fluorescent lamp (CCFL) to emit lights and provide a backlight source for the display apparatus. The lamp driving system 2 of the invention comprises a power factor correction controller 20, a switching circuit 24, a boost transformer 28, a loading resonant network 29, an electrical isolator 22 and a PWM controller 26.

In FIG. 2, the lamp driving system 2 of the invention is divided into a front-end power stage and a back-end power stage according to a boost transformer 28 and an electrical isolator 22. The front-end power stage includes a power factor correction controller 20, a switching circuit 24, a primary side of the electrical isolator 22 and a primary side of the boost transformer 28. The back-end power stage includes a secondary side of the boost transformer 28, a loading resonant network 29, a secondary side of the electrical isolator 22 and a PWM controller 26.

In FIG. 2, the power factor correction controller 20 receives an alternate current power AC and produces the output of a constant high voltage HV, and the high voltage HV produced by the power factor correction controller 20 is provided to a switching circuit 24 coupled to the power factor correction controller 20, and the switching circuit 24 outputs a lamp driving voltage V1 according to the high voltage HV. The boost transformer 28 has a primary side and a secondary side, and the primary side is coupled to the switching circuit 24 and provided or receiving the lamp driving voltage V1. The loading resonant network 29 is coupled to a secondary side of the boost transformer 28 and provided for producing a feedback signal SFB.

The electrical isolator 22 has a primary side and a secondary side, and the primary side is coupled to the switching circuit 24, and provided for jointly and electrically coupling the power factor correction controller 20, a primary side of the boost transformer 28 and the switching circuit 24 to a primary ground end G. The PWM controller 26 is coupled to a primary side of the electrical isolator 22 and the loading resonant network 29, and the PWM controller 26 receives the feedback signal SFB and outputs a control signal SPWM to the switching circuit 24 through the electrical isolator 22, and the PWM controller 26, the loading resonant network 29, a primary side of the electrical isolator 22, and a primary side of the boost transformer are jointly coupled to the secondary ground end g.

The lamp driving system of the invention further comprises a voltage regulator 23 and a system controller 25, and the voltage regulator 23 is coupled to the secondary ground end g and provided for receiving the alternate current power AC and outputting a working voltage VDD. The system controller 25 is coupled to the voltage regulator 23, the PWM controller 26 and the secondary ground end g and provided for receiving the working voltage VDD and outputting a start control signal ST to the PWM controller 26.

In FIG. 2, if the lamp driving system 2 of the invention is started, the system controller 25 will output a start control signal ST to notice the PWM controller 26 to start lighting up the lamp. By then, the PWM controller 26 outputs a control signal SPWM to a secondary side of the electrical isolator 22. The control signal SPWM passing through the electrical isolator 22 is outputted from a primary side of the electrical isolator 22 to the switching circuit 14 for controlling the switching of the switching circuit 14. Meanwhile, the PWM controller 26 will obtain a feedback signal SFB from the loading resonant network 29 and adjust the output of a control signal SPWM according to the feedback signal SFB to maintain the stability of the lamp driving system 2.

The switching circuit 24 switches a high voltage HV produced by the power factor correction controller 20 and outputs a high-frequency high-voltage lamp driving voltage V1 to a primary side of the boost transformer 28. The high-frequency high-voltage lamp driving voltage V1 uses a boost transformer 28 to drive a loading resonant network 29 coupled to a secondary side of the boost transformer. The switching circuit 24 could be a full-bridge switching circuit, a half-bridge switching circuit or a push-pull switching circuit.

Figure 3:
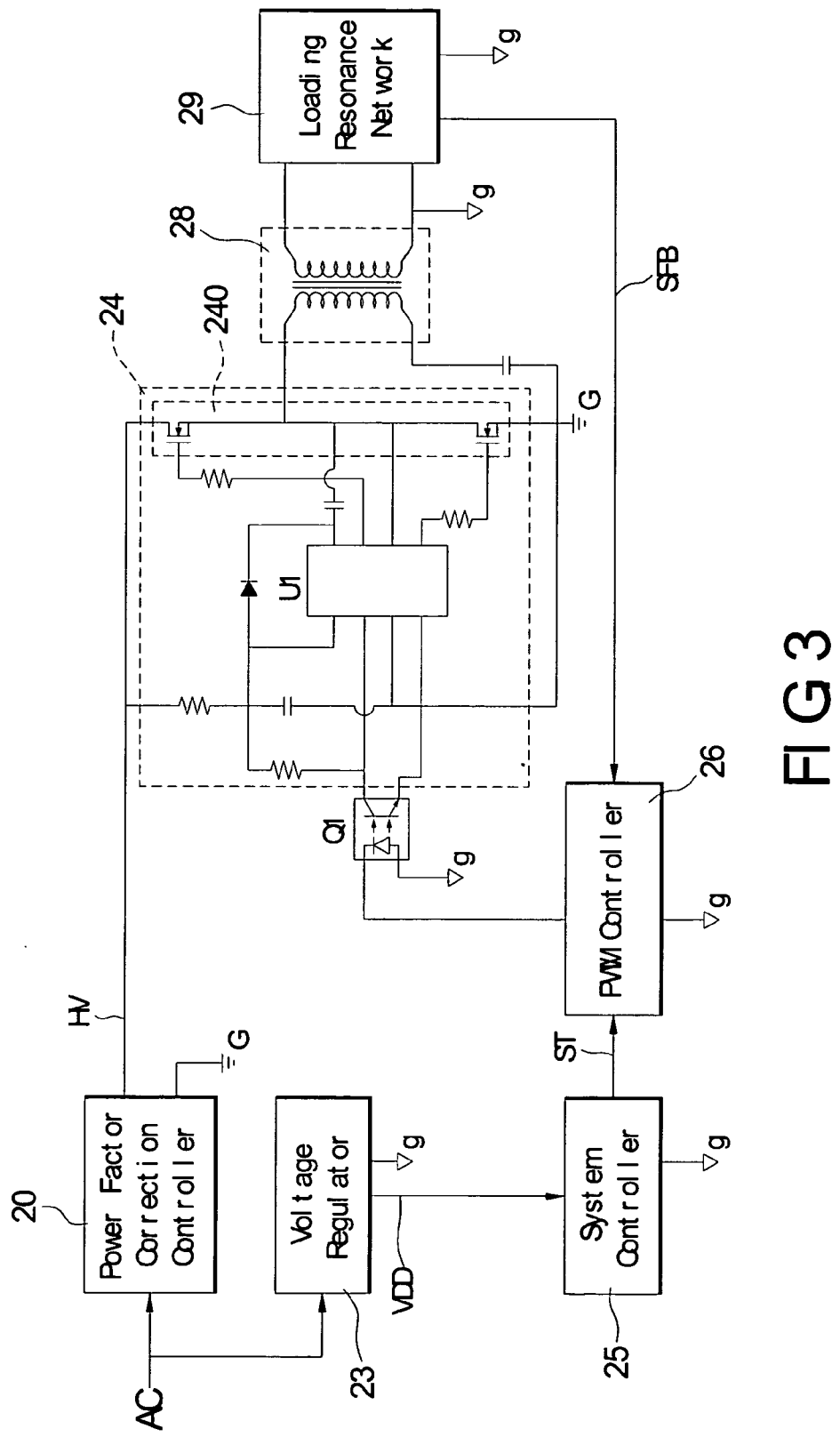
FIG. 3 is a schematic circuit diagram of a lamp driving system in accordance with a first preferred embodiment of the present invention.

Referring to FIG. 3 together with FIG. 2 for schematic circuit diagrams of a lamp driving system in accordance with a first preferred embodiment of the present invention, the same components in these two figures are represented by the same numerals. The principles and effects of the circuits of the first preferred embodiment of the invention are the same as those illustrated in FIG. 2, except the switching circuit 24 of the first preferred embodiment includes an integrated circuit U1 and a switching circuit 240, and the electrical isolator 22 is comprised of an optical coupling switch Q1 or an isolating driving transformer (not shown in the figure).

In the first preferred embodiment, the PWM controller 26 outputs the control signal SPWM to the secondary side of the optical coupling switch Q1, and the control signal SPWM passing through the optical coupling switch Q1 is outputted from a primary side of the optical coupling switch Q1 to the integrated circuit U1, and the integrated circuit U1 controls the switching of the switching circuit 240 according to the control signal SPWM. The model number of the driving integrated circuit U1 is IR2104 or IR2302 and an equivalent driving integrated circuit available in the market.

Figure 4:
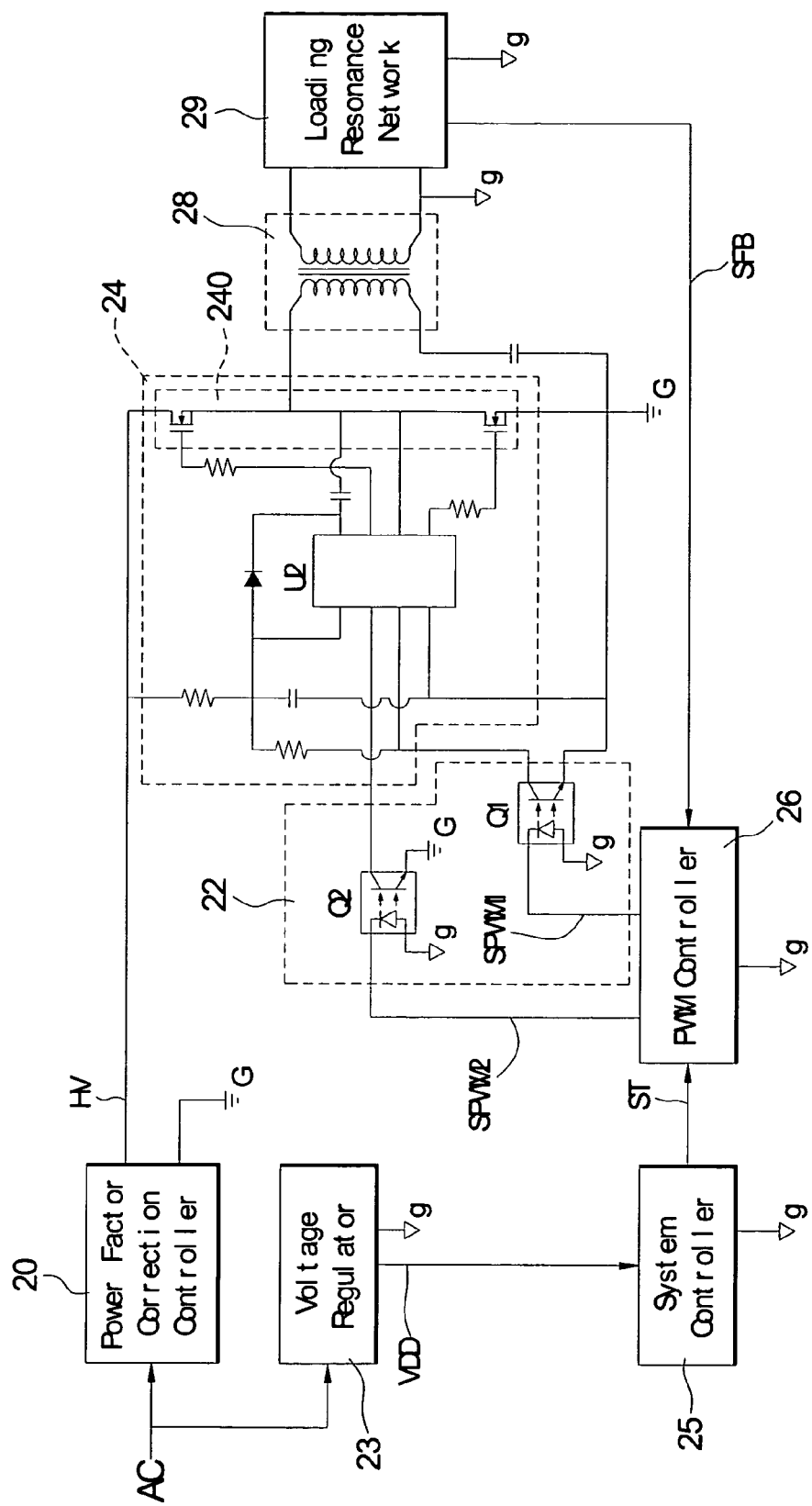
FIG. 4 is a schematic circuit diagram of a lamp driving system in accordance with a second preferred embodiment of the present invention.

Referring to FIG. 4 together with FIG. 2 for schematic circuit diagrams of a lamp driving system in accordance with a second preferred embodiment of the present invention, the same components in these two figures are represented by the same numerals. The principles and effects of the circuits of the second preferred embodiment of the invention are the same as those illustrated in FIG. 2, except the switching circuit 24 of the second preferred embodiment includes a driving integrated circuit U2 and a switching circuit 240, and the electrical isolator 22 is comprised of two optical coupling switches Q1, Q2.

In the second preferred embodiment, the PWM controller 26 outputs control signals SPWM1, SPWM2 to the secondary side of the optical coupling switches Q1, Q2, and the control signals SPWM1, SPWM2 passing through the optical coupling switches Q1, Q2 are outputted from the primary side of the optical coupling switches Q1, Q2 to the driving integrated circuit U2 for controlling the switching of the switching circuit 240 according to the control signals SPWM1, SPWM2. The model number of the driving integrated circuit U2 is IR2301, IR2304 or IR2108 and an equivalent driving integrated circuit available in the market.

Figure 5:
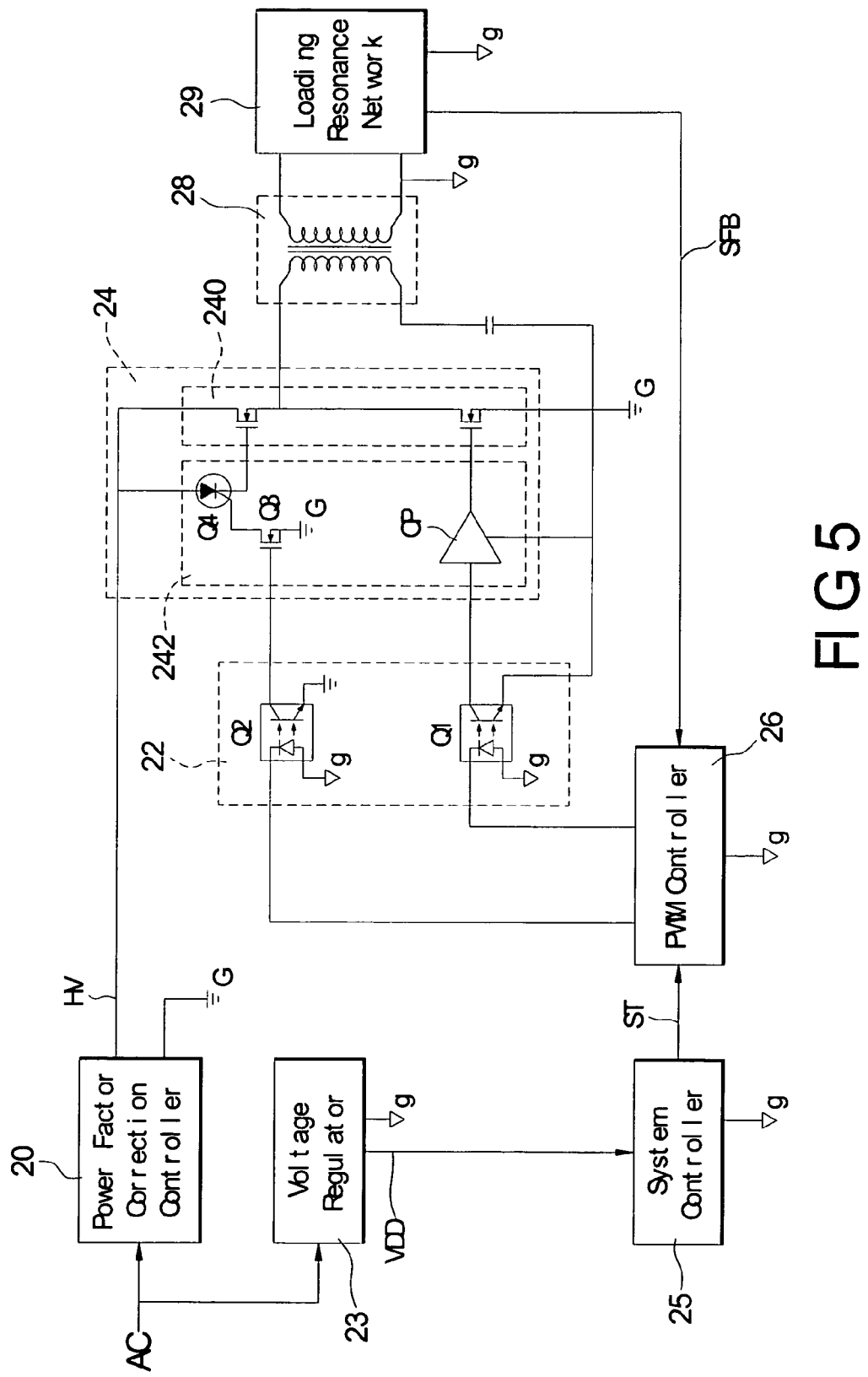
FIG. 5 is a schematic circuit diagram of a lamp driving system in accordance with a third preferred embodiment of the present invention.

Referring to FIG. 5 together with FIG. 2 for schematic circuit diagrams of a lamp driving system in accordance with a third preferred embodiment of the present invention, the same components in these two figures are represented by the same numerals. The principles and effects of the circuits of the third preferred embodiment of the invention are the same as those illustrated in FIG. 2, except the switching circuit 24 of the second preferred embodiment includes a switching circuit 240 and a converting circuit 242, and the electrical isolator 22 is comprised of two optical coupling switches Q1, Q2.

In the third preferred embodiment, the PWM controller 26 outputs control signals SPWM1, SPWM2 to the secondary side of the optical coupling switches Q1, Q2, and the control signals SPWM1, SPWM2 passing through the optical coupling switches Q1, Q2 are outputted from the primary side of the optical coupling switches Q1, Q2 to the converting circuit 242, and the converting circuit 242 controls the switching of the switching circuit 240 according to the control signals SPWM1, SPWM2. The converting circuit 242 is comprised of an amplifier OP having the same phase, a MOS switch Q3 and a SCR switch Q4 coupled with each other.

In summation of the description above, the present invention waives the use of an isolating DC/DC converter 12 in the traditional lamp driving system 1, and sends a constant high voltage HV produced by the power factor correction controller 20 directly to the switching circuit 24. The switching circuit 24 outputs the lamp driving voltage V1 to the primary side of the boost transformer 28 according to the high voltage HV. Meanwhile, the present invention uses an electrical isolator 22 to electrically and safely isolate the PWM controller 26 and the switching circuit 24 for preventing the high voltage HV which is sent to the switching circuit 24 from affecting the control made by the PWM controller 26.

Therefore, the present invention uses the electrical isolator as an isolation of control signals, such that the high voltage produced by the front-end power stage of the lamp driving system will not affect the operations of different controllers of the back-end power stage. With the consideration of the overall price and component layout of the lamp driving system, the invention does not need the use of an isolating DC/DC converter 12, so that the manufacturing cost of the lamp driving system can be reduced greatly.

Although the present invention has been described with reference to the preferred embodiments thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A lamp driving system controlled by electrical isolation, comprising:
    a power factor correction controller, for receiving an AC power and outputting a high voltage;
    a switching circuit, coupled to said power factor correction controller, for receiving said high voltage and outputting a lamp driving voltage;
    a boost transformer, having a primary side and a secondary side, and the primary side of said boost transformer being coupled to said switching circuit and provided for receiving said lamp driving voltage;
    a loading resonant network, coupled to the secondary side of said boost transformer and provided for producing a feedback signal;
    an electrical isolator, having a primary side and a secondary side, and the primary side of said electrical isolator being coupled to said switching circuit, and the primary side of said electrical isolator being coupled to said power factor correction controller, and both primary sides of said switching circuit and said boost transformer being coupled to a primary ground end; and
    a PWM controller, coupled to the secondary side of said electrical isolator and said loading resonant network, and provided for receiving said feedback signal and outputting a control signal and sending said control signal to said switching circuit through said electrical isolator, and said PWM controller, said loading resonant network, the secondary side of said electrical isolator and the secondary side of said boost transformer being coupled jointly to a secondary ground end.

2. The lamp driving system controlled by electrical isolation of claim 1, further comprising a voltage regulator coupled to said secondary ground end, for receiving said AC power and outputting a working voltage.

3. The lamp driving system controlled by electrical isolation of claim 2, further comprising a system controller coupled to said voltage regulator, said PWM controller and said secondary ground end, for receiving said working voltage and outputting a start control signal to said PWM controller.

4. The lamp driving system controlled by electrical isolation of claim 1, wherein said switching circuit is a full-bridge switching circuit, a half-bridge switching circuit or a push-pull switching circuit.

5. The lamp driving system controlled by electrical isolation of claim 4, wherein said switching circuit includes a driving integrated circuit and a switching device.

6. The lamp driving system controlled by electrical isolation of claim 5, wherein said electrical isolator is an optical coupling switch.

7. The lamp driving system controlled by electrical isolation of claim 4, wherein said switching circuit includes a switching device and a converting circuit.

8. The lamp driving system controlled by electrical isolation of claim 7, wherein said electrical isolator is an optical coupling switch.

9. The lamp driving system controlled by electrical isolation of claim 5, wherein said electrical isolator is an isolating driving transformer.

* * * * *